(12) United States Patent
Ramesh et al.

(10) Patent No.: US 8,155,090 B2
(45) Date of Patent: Apr. 10, 2012

(54) METHOD AND APPARATUS FOR EFFICIENT MULTIMEDIA DELIVERY IN A WIRELESS PACKET NETWORK

(75) Inventors: Rajaram Ramesh, Raleigh, NC (US); Kumar Balachandran, Cary, NC (US); Tomas Frankkila, Lulea (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 762 days.

(21) Appl. No.: 11/933,665

(22) Filed: Nov. 1, 2007

(65) Prior Publication Data

US 2009/0116458 A1 May 7, 2009

(51) Int. Cl.
*H04J 3/00* (2006.01)

(52) U.S. Cl. ......... 370/336; 370/329; 370/345; 370/498

(58) Field of Classification Search .................. 348/423, 348/722, 710, 36, 39, 40; 370/336, 395.21, 370/401, 410, 445, 395; 709/231, 247, 217, 709/233, 224; 455/426, 432, 437, 439, 436, 455/552.1, 450, 509
See application file for complete search history.

(56) References Cited

U.S. PATENT DOCUMENTS

| | | | | |
|---|---|---|---|---|
| 6,072,806 A * | 6/2000 | Khouri et al. | | 370/465 |
| 6,584,069 B1 * | 6/2003 | Kagemoto et al. | | 370/230 |
| 6,751,209 B1 * | 6/2004 | Hamiti et al. | | 370/349 |
| 2002/0169823 A1 * | 11/2002 | Coulombe et al. | | 709/203 |
| 2003/0081607 A1 * | 5/2003 | Kavanagh | | 370/392 |
| 2003/0123843 A1 * | 7/2003 | Ino et al. | | 386/46 |
| 2004/0109459 A1 * | 6/2004 | Madour et al. | | 370/401 |
| 2004/0125959 A1 * | 7/2004 | Beuque et al. | | 380/279 |
| 2004/0199653 A1 * | 10/2004 | Amini et al. | | 709/231 |
| 2004/0210944 A1 * | 10/2004 | Brassil et al. | | 725/135 |
| 2004/0215448 A1 * | 10/2004 | Funatsu et al. | | 704/201 |
| 2004/0215698 A1 * | 10/2004 | Bertin | | 709/201 |
| 2004/0244043 A1 * | 12/2004 | Lind et al. | | 725/111 |
| 2005/0165917 A1 * | 7/2005 | Le et al. | | 709/220 |
| 2006/0203924 A1 * | 9/2006 | Casaccia et al. | | 375/260 |
| 2007/0055762 A1 * | 3/2007 | Bachner et al. | | 709/223 |
| 2008/0313729 A1 * | 12/2008 | Foschiano et al. | | 726/12 |

* cited by examiner

*Primary Examiner* — Hassan Phillips
*Assistant Examiner* — Anez Ebrahim (57) ABSTRACT

The present invention sends multiple versions of a multimedia packet to the base station, and, based on the radio channel and traffic characteristics, an appropriate version of the multimedia packet is selected to send to the mobile station at a given time. In this way, source transmission is improved to instantaneous conditions. The steps of the present invention are performed in conjunction with RTP used for multimedia transmission over internet protocol (IP) networks. In a first embodiment, the multiple versions are sent to the base station in the same RTP packet, and the base station strips out the extraneous versions. In a second embodiment, the base station receives multiple RTP packets having identical information in the packet header in many fields, and selects an appropriate one among these for transmission to the mobile station, discarding the rest.

9 Claims, 6 Drawing Sheets

FIGURE 1

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|X|  CC   |M|     PT      |       sequence number         |
+-+-+-+-+-+-+-+-+-+-+-+-+-+-+-+-+-+-+-+-+-+-+-+-+-+-+-+-+-+-+-+-+
|                           timestamp                           |
+-+-+-+-+-+-+-+-+-+-+-+-+-+-+-+-+-+-+-+-+-+-+-+-+-+-+-+-+-+-+-+-+
|            synchronization source (SSRC) identifier           |
+=+=+=+=+=+=+=+=+=+=+=+=+=+=+=+=+=+=+=+=+=+=+=+=+=+=+=+=+=+=+=+=+
|             contributing source (CSRC) identifiers            |
|                              ....                             |
+-+-+-+-+-+-+-+-+-+-+-+-+-+-+-+-+-+-+-+-+-+-+-+-+-+-+-+-+-+-+-+-+
```

FIGURE 2             RTP PACKET

METHOD AND APPARATUS FOR EFFICIENT MULTIMEDIA DELIVERY IN A WIRELESS PACKET NETWORK

CROSS-REFERENCE TO RELATED APPLICATIONS

Not Applicable.

BACKGROUND

Wireless networks are used for a variety of applications. Traditionally, the main application has been voice, delivered over a circuit switched network. The network has since been adapted to deliver circuit switched and packet switched data. With higher speed networks, applications such as video telephony will soon become available.

Within such a framework, a limited amount of functionality exists to tailor the service to the environment. For example, Global System for Mobile Communications (GSM) and Wideband Code Division Multiple Access (WCDMA) networks use the Adaptive Multi-Rate (AMR) vocoder for voice, which facilitates changes in the source rate with changing channel conditions in order to enable the best perceptive performance. Within AMR, means exist to signal to a distant vocoder that receiver conditions have changed and that a different vocoder rate is preferable.

Typically, in such a network, one vocoder is at the mobile device, and another vocoder is at a transcoder unit or media gateway in the network. The media gateway converts the encoded voice into a form that can be transported over other networks. Thus, the rate change for voice communication occurs between the mobile device and the media gateway. Generally, information about the quality of the radio link is available only at the base station and the mobile device, and this information has to be signaled to the vocoder, which is available locally at the mobile device, or is a remote node in case of the media gateway. In GSM networks, in-band signaling within the AMR packets is used to signal the desired vocoder rate to the vocoder at the remote end; thus the vocoder rate can be adjusted depending on the condition of the individual radio link. In WCDMA networks, an out-of-band signaling is used to signal the desired vocoder rate. This is particularly applicable to circuit based voice transmission.

Wireless networks are gradually being converted to packet switched architectures with a trend towards all application data being delivered using packet switching. For example, voice over IP (VoIP) is being considered as the primary means of delivering voice for telephony. Most other applications, including video, audio and other multimedia applications will also be delivered via the packet network. Real time source information for applications such as these is typically sent using Real-Time Protocol (RTP) which attaches a timestamp and a sequence number to every packet at the source. The RTP packet is transmitted using User Datagram Protocol (UDP) and the Internet Protocol (IP). At the destination, the receiver may use the timestamp information to replay the packets at the correct relative time. Additionally, the timestamp can be used to determine whether the packet has lost its usefulness along the path to its destination. The sequence number is used to track lost or duplicated packets. The RTP protocol operates between the source and the receiver. Some sources may send information in a format that is not interpretable by the receiver; the media gateway can then convert this to a format that is understood by the receiver. Such operation is negotiated during the set up of the session. In this case, the RTP protocol operates between the media gateway and the receiver.

In the IP framework, a limited amount of adaptation to the link capability is possible. Many sources encode data in a format that is suitable for the average quality of the link. This is often done by querying the receiver about the link capability (e.g., 128 kbps, 1 Mbps, etc.), or can be done automatically by sounding the link and getting feedback as to the data capability. However, this method is not suitable for links whose quality can vary dynamically. The quality of wireless links varies at the speed of the fading, and can also vary with varying traffic levels. In such cases, the delay in providing feedback may be large enough that efficient adaptation to the link is not possible. In packet switched radio networks, the optimum transmission format (such as vocoder rate) has to take into account the instantaneous radio channel quality, and other factors such as the traffic load and the retransmission schemes (such as hybrid ARQ). Most of this information is only available at the base station, and not at the remote source coder. There are currently significant technical obstacles to sending information on all these parameters to the remote source coder in an expedient manner so that the coder can react to instantaneous conditions.

The so-called M-pipe project is currently being designed to overcome the significant technical obstacles hereinabove described. The M-pipe project is directed to developing new media codecs that produce scalable encodings that can be locally adapted to conditions, and in the development of signaling mechanisms that can be used to convey to network nodes the scalable nature of such encodings. Disadvantageously, the project lacks the ability to use existing media codecs that do not produce scalable media.

Progressive or scalable coding is utilized in systems such as DVB-T and DVB-H, wherein hierarchical modulation schemes (e.g. 16QAM and QPSK) are used to convey source data of different fidelity to users with different radio conditions. Such operation is mainly for broadcast transmission, and no notion of adapting to a particular user is considered in these systems.

In U.S. Pat. No. 7,194,000 to Balachandran and Ramesh a method is described wherein progressive encodings of source data are encoded in multiple packets with different priorities being assigned to the packets based on the importance of the data. The scheduling function is capable of dropping packets of lower priority, but is still able to deliver sufficient source data to the receiver in order to render the multimedia information at some level of fidelity. Disadvantageously, this method only allows a coarse level of adaptation to radio conditions.

What is desired is a method and system adapted to select the best format for transmission without the need for such detailed feedback.

SUMMARY

The present invention provides a method by which multimedia data can be delivered in an efficient fashion in a radio environment where conditions can rapidly vary. The present invention further provides a system of network architecture and network nodes with enhanced functionality that facilitates the implementation of the method of the present invention. The efficient delivery of multimedia data is achieved with no modification to transport protocols used in IP networks (such as TCP, UDP and Internet Protocol (IP)), and minor modifications to payload formats for RTP. In addition, the present invention presents mechanisms for signaling functionality across a network by exploiting conventional protocols used in networks based on IP.

The present invention sends multiple versions of the multimedia packet to the base station, and, based on the radio channel and traffic characteristics, the base station selects an appropriate version to send to the mobile station at a given time, so as to improve source transmission to instantaneous conditions. This is performed in conjunction with RTP used for multimedia transmission over internet protocol (IP) networks. In a first embodiment, the multiple versions are sent to the base station in the same RTP packet, and the base station strips out the extraneous versions. In a second embodiment, the base station receives multiple RTP packets having identical information in the packet header in many fields, and selects an appropriate one among these for transmission to the mobile station, discarding the rest.

BRIEF DESCRIPTION OF THE DRAWINGS

In the following section, the invention will be described with reference to exemplary embodiments illustrated in the figures, in which.

DETAILED DESCRIPTION OF THE INVENTION

Figure 1:
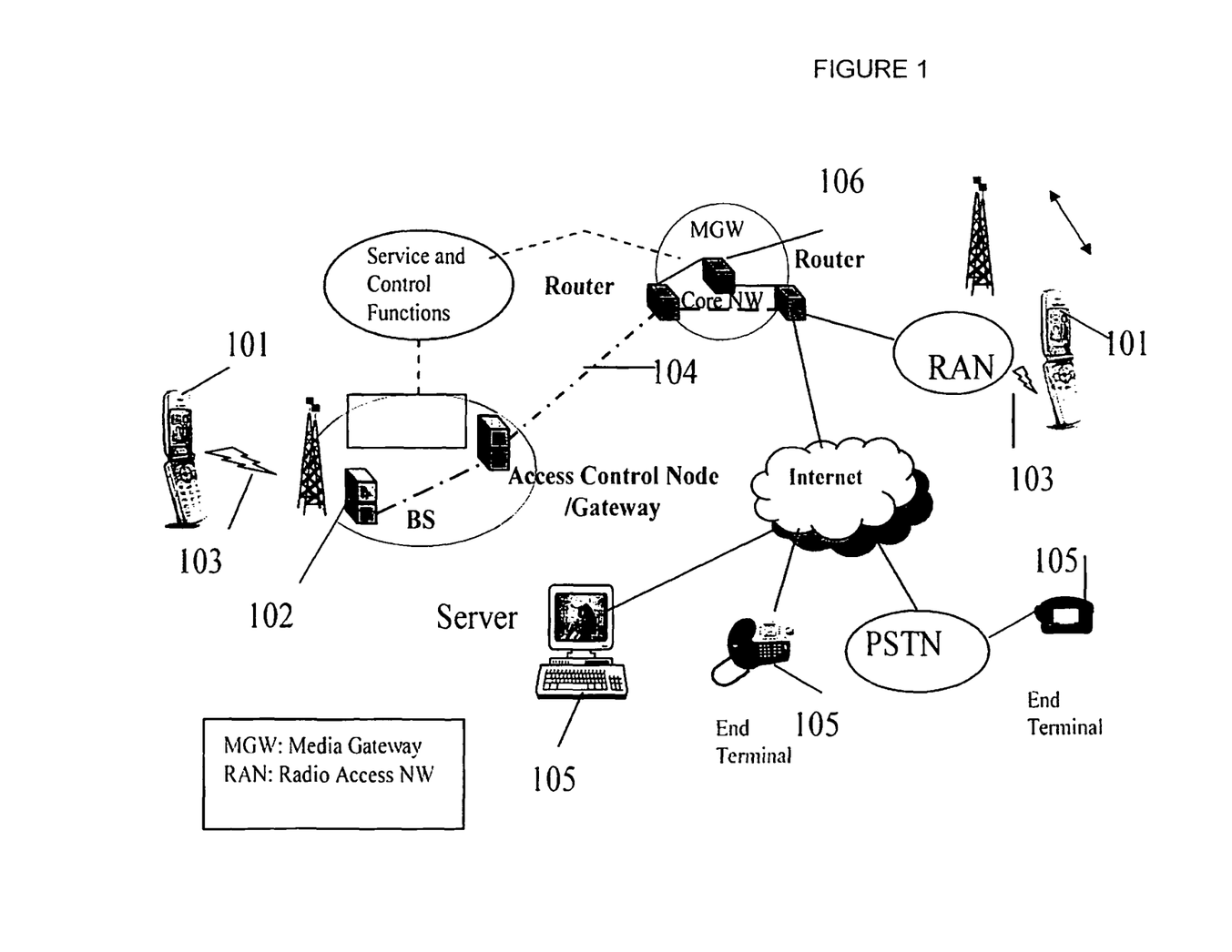
FIG. 1 illustrates the architecture of a mobile network configured to carry multimedia according to the present invention

FIG. 1 illustrates the architecture of a mobile network 100 configured to carry multimedia according to the present invention. As seen therein, a mobile station 101 communicates with a base station 102 via an air interface 103. The base station 102 is connected to a backbone network 104. The backbone network 104 enables communication between the mobile station 101 and a radio access network and media gateway (not shown) then to another end terminal or server 105. In many situations, the end terminal or server 105 is capable of generating multimedia information in formats that can be understood by the mobile station 101. In such a case, the end terminal or server 105 may also perform the functions of encapsulating the multimedia information in an RTP packet, which may be transported using protocols such as UDP over the IP network. In other situations, a media gateway 106 converts the signal received from the end terminal or server 105 to a format that can be understood by the mobile station 101. In this case, the media gateway 106 or an associated node may perform the encapsulation of the multimedia information within an RTP packet.

Figure 2:
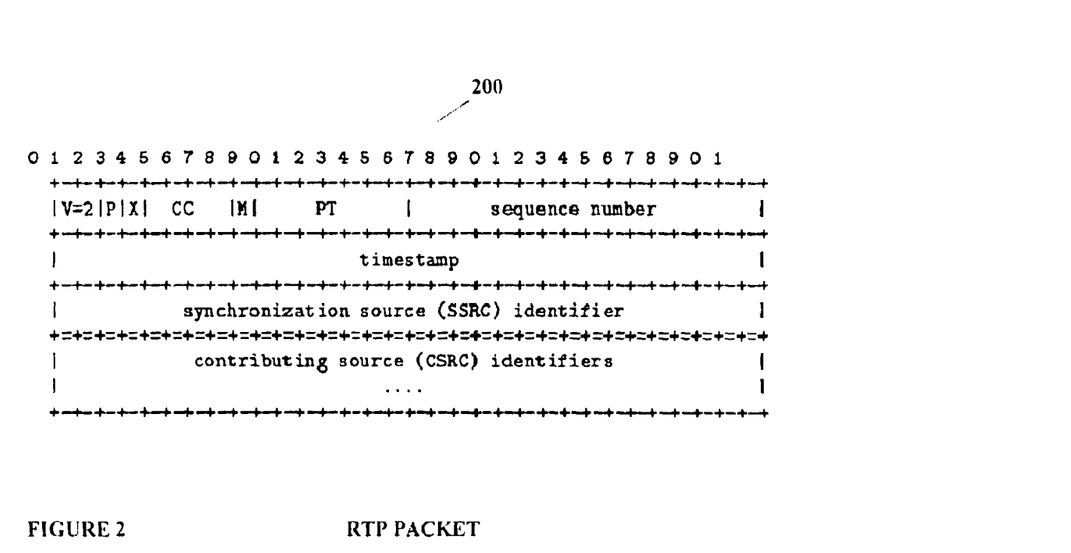
FIG. 2 is a diagram of an RTP packet utilized in the implementation of the present invention.

As seen in FIG. 2, the RTP packet 200 consists of a header and payload information. The header information includes a payload type field, a sequence number and a timestamp. The payload type field identifies the type of multimedia information and the multimedia codec used. For example, the payload type may indicate that the AMR codec was used. The sequence number is used by the receiver to sequence packets and obtain information on lost packets. The timestamp gives information to the multimedia playback device at the receiver on relative times when the multimedia information needs to be played back. The specific AMR coding rate used is not part of the RTP header, but is signaled in the first few bits of the RTP payload. The rest of the payload includes the encoded speech bits. It will be appreciated that the payload size will change depending on the AMR coding rate.

Referring back to FIG. 1, in many IP networks, the base station 102 (or an associated gateway 106) performs the function of protocol header compression for many transport protocols as part of the convergence sublayer of the protocol stack. In particular, the base station 102 may perform compression of the RTP/UDP/IP header by suppressing redundant, predictable or constant information. One such header compression scheme, robust header compression (ROHC), is defined in Internet Engineering Task Force (IETF) Request For Comments (RFC) 3095, and is expected to be commonly used in wireless IP networks due to its robustness. It will be appreciated that the base station 102 analyzes the header of the RTP packet to perform such compression.

In the present invention, multiple versions of the same multimedia information are generated. On the uplink, the mobile station 101 most likely generates the source information, and also has access to knowledge of the channel conditions, and thus may advantageously generate source information corresponding to an appropriate version. The mobile station 101, may also generate multiple AMR encoded packets for voice at different AMR coding rates, but may only send the one most suited to the current conditions on the wireless channel using a single RTP packet. Thus, the transmission of multimedia information can be improved for the uplink in a straightforward fashion. In general, the base station has knowledge of the channel condition experienced by the mobile station's transmission in some sense. Based on such information, the base station in many wireless systems allocates transmission resources to the mobile station. By a suitable allocation of resources, the base station may force the mobile station to use a specific transmission format. Alternatively, the base station may also command the mobile station to use a specific transmission format.

On the downlink, the problem is more complicated. The multiple versions (sometimes referred to as encodings) of the same multimedia information may be generated at the end terminal or server 105, or can also be generated at the media gateway 106 or in a transcoding function in the network. These multiple versions of the same multimedia information may be sent in a single RTP packet or multiple RTP packets.

Figure 3:
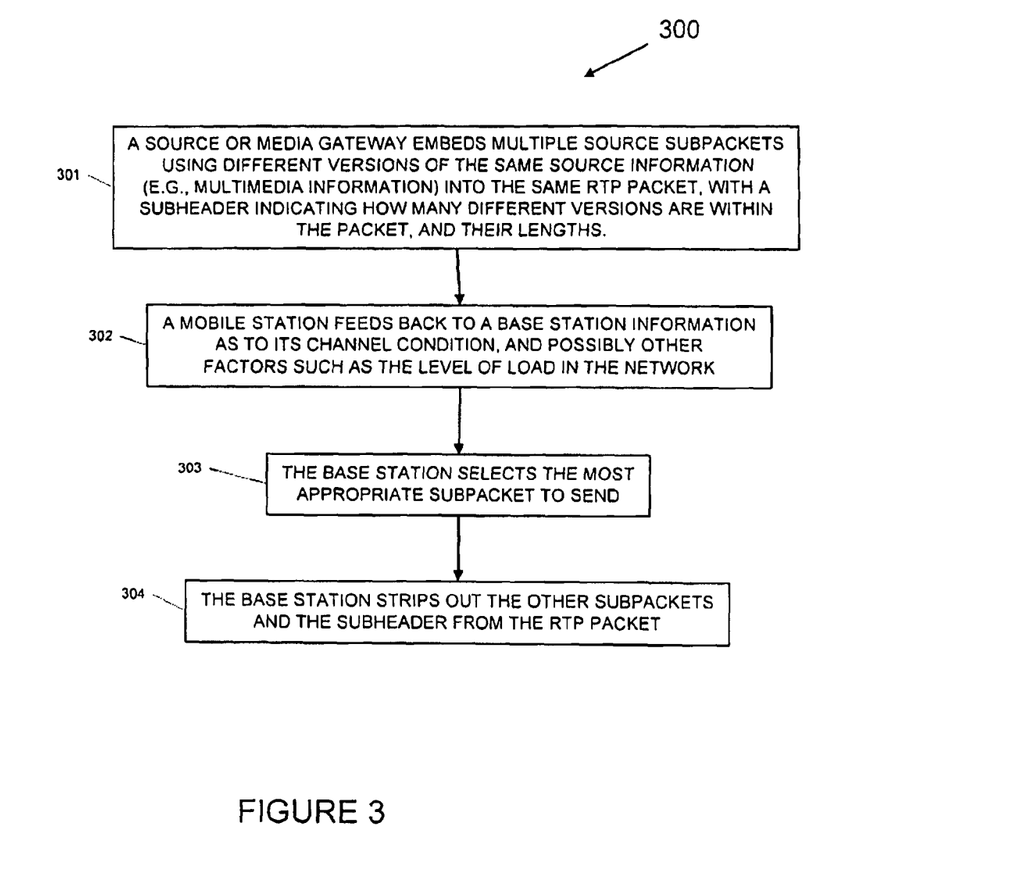
FIG. 3 is a flow chart illustrating a first embodiment of the method of the present invention.

FIG. 3 provides a flow chart 300 of a method of a first embodiment of the present invention. As seen therein, in step 301, a source or media gateway embeds multiple source sub-packets using different versions of the same source information (e.g., multimedia information) into the same RTP packet, with a subheader indicating how many different versions are within the packet, and their lengths. In step 302 (in alternative embodiments step 302 may occur prior to step 301), a mobile station feeds back to a base station information as to its channel condition. The base station also has access to other factors such as the level of load in the network. In step 303, the base station selects an appropriate sub-packet to send and strips out the other subpackets and the subheader from the RTP packet before forwarding to the mobile station in step

304, based on the information received from the mobile station in step 302. A payload format modified from that described in IETF RFC 2198 "RTP Payload for Redundant Audio Data" may be used as an exemplary embodiment wherein multiple encodings are included in the same RTP packet. IETF RFC2198 describes methods to send payload data for current and previous multimedia frames in order to have redundant data to protect against packet losses. However, in IETF RFC 2198, a timestamp offset is sent with the secondary data from previous frames.

In contrast, in the present invention, the same payload format as in IETF RFC 2198 can be used to send multiple payloads at the same time, but in the present invention the timestamp offset is set to zero. A packet filter at the base station analyzes this compound packet and selects an appropriate description to send to the mobile station on the downlink in step 303. As noted above, the base station selects an appropriate packet of the multiple versions to send to the mobile station (after suitable header compression) depending on feedback from the mobile station as to its channel condition, and possibly other factors such as the level of load in the network. Thus, the base station performs the combined operation of the convergence function and the scheduling function. The scheduling operation may be chosen to improve error performance on the link to the mobile station, or to improve the level of traffic being served, or an appropriate combination of the two. The present invention comprises a method for improving multimedia delivery over a wireless internet protocol (IP) network, having the steps of generating multiple versions of a multimedia packet; sending the multiple versions of a multimedia packet to a base station; and based on the operating conditions such as radio channel, network and/or traffic characteristics, selecting an appropriate version of the multiple versions of a multimedia packet to send to a receiving mobile station at a given time. Traffic characteristics might be local characteristics such as conditions affecting a stream to a specific mobile station or can be local within a specific cell that affects all users within the cell or local in the sense of streams of the same type, such as 10 VoIP streams to 10 mobile stations within one cell. On the other hand, network characteristics have more of a global scale, for example, a larger portion of the operators' system, such as a group of cells, or an entire network in a region, and would include both radio channel characteristics and backbone network characteristics, such as congestion in routers and gateways.

Figure 4:
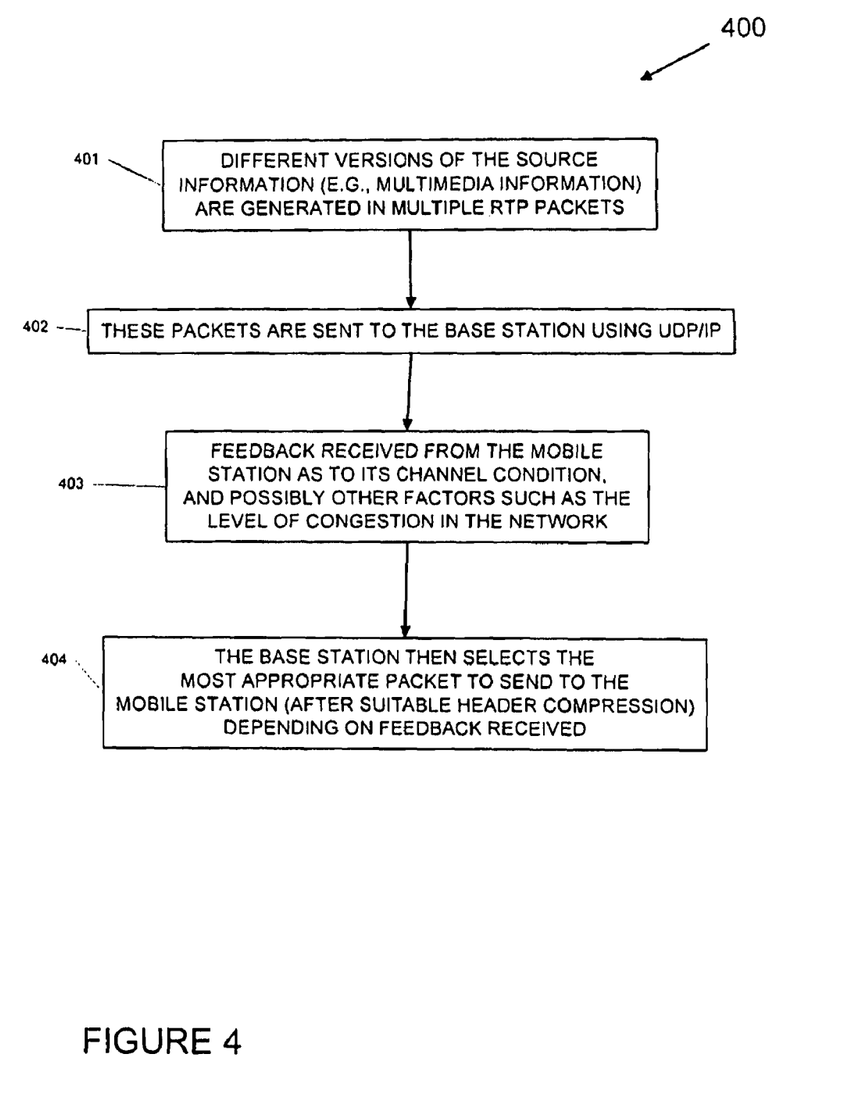
FIG. 4 is a flow chart illustrating a second embodiment of the method of the present invention.

FIG. 4 is a flow chart of a second embodiment 400 of the present invention. As seen therein, different versions of the source information (e.g., multimedia information) are generated in multiple RTP packets in step 401. The payload type, sequence number and timestamp information in the RTP headers for these multiple packets are all the same, but the payload is different. All these packets are sent in step 402 to the base station using UDP/IP. Though there are multiple packets that have the same RTP sequence number, this will be transparent to most routers and nodes in the IP network which will pass them along as routers and nodes do not analyze packets to the level of the RTP header. It is noted that RTP operation in conformance with IETF RFC 3550 does not explicitly preclude the sending of multiple packets with the same sequence number, although, conventionally, sending of multiple packets with the same sequence number would not be generally expected.

In a typical wireless packet network, such as WiMAX or High Speed Packet Access (HSPA) within WCDMA, the packet filter within the base station analyzes the RTP headers of the packets received within a certain time window appropriately chosen by the base station. If it finds multiple packets that have the same payload type, sequence number and timestamp, but different lengths and/or different AMR rate information, then it recognizes these packets as corresponding to multiple versions of the same multimedia information. In step 404, the base station then selects an appropriate packet to send to the mobile station (after suitable header compression) depending on feedback received, in step 403, from the mobile station as to its channel condition, and possibly other factors such as the level of congestion in the network. As in the first embodiment, the base station performs combined operation of the convergence functions and the scheduling function. When the RTP payload is encrypted, using protocols such as Secure Real Time Protocol (SRTP), the base station may not be able to read the AMR rate information within the payload and thus will be configured to make a decision based on packet length alone. If the RTP payload is not encrypted, then the packet filter can read the AMR rate information within, and can select an appropriate transmission scheme at the physical layer (modulation and coding scheme etc.) Obviously, the initiation of the packet filter in the data path is predicated by the absence of end-to-end encryption.

In another aspect of the present invention, each AMR format can be generated using a different contributing source, but with the same time-stamp information, as possible within RTP because the contributing source information can be included as part of the RTP header. In this embodiment, the packet filter examines the incoming RTP packets having the same timestamp, but different contributing source information, and thus selects the appropriate source format to send over the air link. The packet filter may be part of a Media Resource Function (MRF). A typical use of an MRF is to enable mixing of sources for conferencing. In the present invention, MRF is used to select one or more of multiple sources. In such case, the RTP packets corresponding to multiple source descriptions at the same time will most likely have the same timestamp but possibly different sequence numbers, and different contributing source numbers, which is within the strict norms of acceptable operations as per the RTP protocol described in IETF RFC 3550. It is possible to enable features such as conference calls in combination with the present invention and the use of different contributing sources for different descriptions of the source. In such a case, each real source will have a subset of contributing source numbers associated with it for the multiple versions. The packet filtering rule at the MRF will select one packet with the appropriate contributing source number from each real source.

In another implementation of the present invention, the end terminal, server or media gateway may use another protocol header below RTP or a RTP header extension to signal to the base station that the same multimedia information is encoded in different packets.

Further, in implementing the present invention in the case of mobile to mobile calls, a first mobile station (on the uplink) will only transmit a source description appropriate for its channel conditions. In such case, the media gateway may perform the transcoding function and generate the multiple versions, which can then be sent to the MRF at the base station. The base station will then select an appropriate version to send to the receiving mobile station on the downlink in accordance with the present invention. In such a case, the transcoding function at the media gateway may be configured to only generate descriptions of lower rate than the one received from the transmitting mobile.

The present invention can also be implemented in video telephony applications. In this implementation, a video telephony source is constructed that has multiple versions of the video and audio streams corresponding to the call. Thus, the present invention enables the choice of the video and audio description based on the channel quality, grant information or congestion. The present invention can further be extended to the case when congestion or radio channel quality precludes the continuation of the video stream. In such case, the video stream can be selectively suppressed, while some suitable description of the audio stream is scheduled for transmission.

The present invention can also be used in mobile station handover scenarios. Typically, after a handover, it takes a significant amount of time for the mobile station to learn the radio channel conditions so that the transmission can be tailored appropriately. Using the methods of the present invention, optimization of the transmission format to the new radio link can commence sooner.

Figure 5:
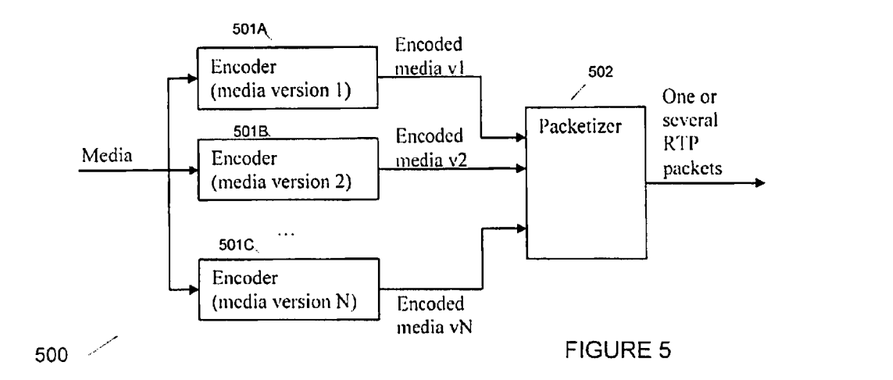
FIG. 5 is an aspect of the present invention illustrating media originating from a transmitting mobile station.

Referring now to FIG. 5, an aspect 500 of the present invention wherein media originating from a transmitting mobile station is shown. As seen therein, the original media is encoded using a plurality of encoders 501A, 501B, 501C into several versions with different bit rates (packet sizes). The different versions are encapsulated in one or several RTP packets using packetizer 502.

Figure 6:
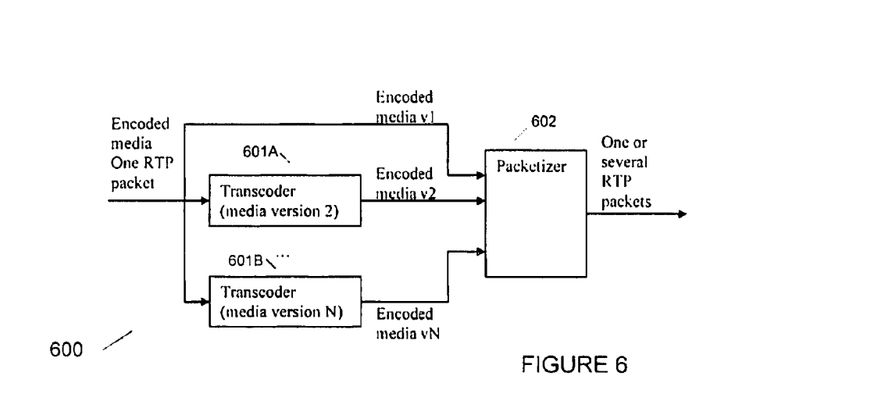
FIG. 6 is an aspect of the present invention illustrating the original media being transcoded (meaning, instead of one (normal) encoding-decoding, transcoding uses two encoding-decoding stages) in a media gateway and then encapsulated in one or several RTP packets.

FIG. 6 is an aspect 600 of the present invention illustrating the original media being transcoded using a plurality of transcoders 601A, 601B in a media gateway and then encapsulated in one or several RTP packets using packetizer 602. As seen therein, the originally encoded media is received and transcoded into several different encoding versions of the media where the different versions use different bit rates and create different packet/payload sizes. The different versions are encapsulated in one or several RTP packets.

Figure 7:
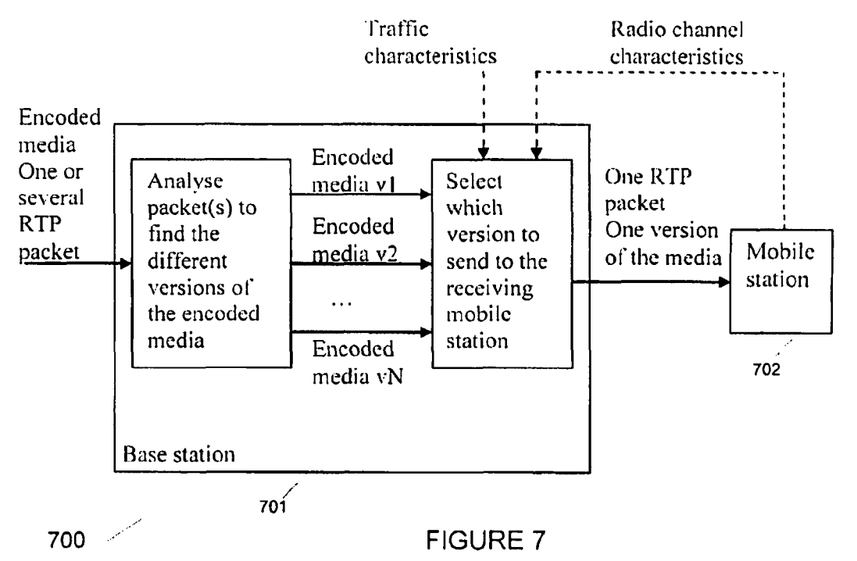
FIG. 7 is an aspect of the present invention illustrating the several versions of the encoded media being received and processed in a base station and one version being sent to a receiving mobile station.

FIG. 7 is an aspect 700 of the present invention illustrating the several versions of the encoded media being received and processed in a base station 701 and one version being sent to a receiving mobile station 702. As seen therein, several versions of the encoded media are received by the base station. The base station analyzes the received packet(s) to find the different versions of the encoded media. Based on traffic characteristics and/or radio channel characteristics, the base station selects which version to send to the receiving mobile station In each embodiment of the present invention, one function that is performed is the instantiation of a packet filter that is selectively capable of processing multiple versions of sources before one or more descriptions are transmitted over the air. The packet filter is activated by one of several possible signaling methods:

1. The first method involves use of call control techniques such as a SIP•INFO message or a SIP•NOTIFY message that informs the call processing function that specialized treatment of the source is desired before transmission over the air. The call-control function, implemented in this example using the Session Initiation Protocol (SIP), in turn activates a packet processing function in the radio network. For example, the packet processing function also known as a packet filter can be activated for a given secondary PDP context (optionally using the Packet Flow Identity (PFI) and the Packet Flow Context (PFC)) at the SGSN in a GSM/EDGE Network. Alternatively, the packet filter can be activated at a base station in a packet network such as WiMAX by changing the classifier rule at the MAC Layer that activates a specialized packet processing function for specific multiple-description formals. Similar constructions are possible in the WCDMA network to achieve the same ends.
2. The second method involves using the unique knowledge about services that exists on the mobile station to request changes to the QoS characteristics for a particular connection. In a GSM/EDGE network or a WCDMA network, the mobile station would send a MODIFY PDP CONTEXT message to activate specific packet filtering functionality for a given service. In a different wireless network such as WiMAX, the mobile station would change the characteristics of the classifier rule at the MAC layer at the base station to activate specialized processing functions for specific multiple version formats.

The advantages of the present invention include as follows:
(1) Multimedia transmission is tailored to instantaneous radio network and air interface conditions, thereby leading to a better multimedia experience. Note that the present invention can also be used in conjunction with schemes that allow feedback on desired codecs to the source. Typically, such feedback is slow, and is sent after much averaging, but can be used to control the number of versions of multimedia information used at the source, which can then be used by the base station to tailor to instantaneous conditions.
(2) The present invention can be performed using existing protocols used on the IP network. As a result, it has minimal impact on existing IP network components. For example, routers in the network will pass the IP packets of the present invention without the need for modification in the router functions. The UDP mechanism is also unaffected.
(3) No feedback is needed at the end terminal, server or media gateway to enable such improved transmission.
(4) Adaptation for broadcast/multicast is enabled. For example, a broadcast scheme in which available bandwidth (after serving user traffic) is used to send broadcast multimedia information can be envisioned wherein the source format that fits in the available bandwidth can be used to support broadcast functionality.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:
1. A method of enabling mobile-to-mobile multimedia calls in a wireless Internet Protocol (IP) network, comprising:
sending a single version of a multimedia packet from a first mobile station to a first base station;
sending the multimedia packet from the first base station to a media gateway;
generating, at the media gateway, multiple versions of the multimedia packet;
sending, to a second base station, the multiple versions of the multimedia packet, wherein the multiple versions of the multimedia packet are received in a single Real-Time Protocol (RTP) packet;
selecting, by the second base station, an appropriate version of the multiple versions of the multimedia packet to send to a second mobile station, wherein the selecting further comprises
receiving, from the second mobile station, a channel condition of the second mobile station, wherein the channel condition affects the perceptive performance of multimedia content, and
selecting, by the second base station, the appropriate version of the multiple versions of the multimedia packet to send to the second mobile station based on at least the channel condition of the second mobile station;

removing, by the second base station, the other multiple versions of the multimedia packet from the single RTP packet; and in response to the removing, forwarding, by the second base station, to the second mobile station, the appropriate version of the multiple versions of the multimedia packet in the single RTP packet.

2. The method of claim 1,
wherein the multiple versions of a multimedia packet are generated at a server or an end-terminal.

3. The method of claim 1,
wherein the multiple versions of a multimedia packet are generated in a transcoding function in a media gateway.

4. The method of claim 1, wherein a packet filter at the second base station performs the task of selecting an appropriate version of the multiple versions of the multimedia packet.

5. The method of claim 4, wherein the packet filter is instantiated using a call control function that informs a call processing function that specialized treatment of a source is desired before transmission.

6. The method of claim 4, wherein the packet filter is instantiated by requesting changes to a quality-of-service (QoS) characteristic of a wireless connection in the wireless IP network.

7. The method of claim 1, wherein sub-headers in the RTP packet specify timestamp offsets.

8. The method of claim 7, wherein the second base station performs header compression before sending the appropriate version of the multimedia packet.

9. The method of claim 1, wherein an RTP packet format according to IETF RFC 2198 is used to send the multiple versions of the multimedia packet in sub-packets, without timestamp offsets between the sub-packets.

* * * * *

UNITED STATES PATENT AND TRADEMARK OFFICE
CERTIFICATE OF CORRECTION

PATENT NO. : 8,155,090 B2  Page 1 of 1
APPLICATION NO. : 11/933665
DATED : April 10, 2012
INVENTOR(S) : Ramesh et al.

It is certified that error appears in the above-identified patent and that said Letters Patent is hereby corrected as shown below:

In Fig. 1, Sheet 1 of 6, insert --  --, above the figure.

In Column 4, Line 61, delete "embodiments" and insert -- embodiments, --, therefor.

Signed and Sealed this
Third Day of July, 2012

David J. Kappos
*Director of the United States Patent and Trademark Office*